United States Patent
Vaman et al.

(10) Patent No.: US 7,293,094 B2
(45) Date of Patent: Nov. 6, 2007

(54) METHOD AND APPARATUS FOR PROVIDING END-TO-END QUALITY OF SERVICE IN MULTIPLE TRANSPORT PROTOCOL ENVIRONMENTS USING PERMANENT OR SWITCHED VIRTUAL CIRCUIT CONNECTION MANAGEMENT

(75) Inventors: Dhadesugoor R. Vaman, Frederick, MD (US); Thanabalan Paul, Gaithersburg, MD (US); Joonbum Byun, Rockville, MD (US)

(73) Assignee: Boyle Phosphorus LLC, Las Vegas, NV (US)

( * ) Notice: Subject to any disclaimer, the term of this patent is extended or adjusted under 35 U.S.C. 154(b) by 644 days.

(21) Appl. No.: 09/847,039

(22) Filed: May 1, 2001

(65) Prior Publication Data

US 2002/0055990 A1    May 9, 2002

Related U.S. Application Data

(63) Continuation-in-part of application No. 09/435,549, filed on Nov. 8, 1999, now abandoned.

(51) Int. Cl.
G06F 15/16    (2006.01)
(52) U.S. Cl. .................. 709/227; 709/228; 370/353; 370/431
(58) Field of Classification Search ........ 709/220–229; 370/353, 431
See application file for complete search history.

(56) References Cited

U.S. PATENT DOCUMENTS 5,530,698 A * 6/1996 Kozaki et al. .............. 370/355

(Continued)

OTHER PUBLICATIONS

McDysan, David et al. ATM Theory and Application. Signature Edition, McGraw-Hill. 1999. pp. 285-343, 401-441, 635-636, 865-878, 937-943.*

(Continued)

Primary Examiner—Jason Cardone
Assistant Examiner—Jeffrey R Swearingen
(74) Attorney, Agent, or Firm—Michael J. Donohue; Davis Wright Tremaine

(57) ABSTRACT

A method and apparatus for ensuring end-to-end QoS for user applications operating in multi-transport protocol environments while using PVC or SVC connection management procedures. A user application at a workstation having specific QoS requirements can selectively connect to one of a plurality of servers having varying QoS profiles, regardless of the transport protocols used in the underlying network. The user application initiates a session with a first QoS negotiator and a first QoS selector. The first QoS negotiator queries a second QoS negotiator for the QoS profile of a connected server. The second QoS negotiator, in conjunction with a second QoS selector, notifies the server of the address of the second QoS negotiator. The second QoS negotiator, in conjunction with the second QoS selector, sends a response to the first QoS negotiator and the first QoS selector indicating QoS profile and connection information of the server. The first QoS selector stores the received QoS profile and connection information in a database. The database is then queried by the user application to determine if a server having the desired QoS profile exists. If such a server does not exist, the QoS selection and negotiation procedures are repeated and the database is updated. If a server having the desired QoS profile does exist, a PVC or SVC connection is established between the first and second QoS negotiators and QoS selectors, thereby ensuring end-to-end QoS for the user application and allowing the application to exchange data with the server using the PVC or SVC connection.

13 Claims, 7 Drawing Sheets

U.S. PATENT DOCUMENTS

| | | | | |
|---|---|---|---|---|
| 5,539,884 | A * | 7/1996 | Robrock, II | 709/227 |
| 5,581,544 | A * | 12/1996 | Hamada et al. | 370/253 |
| 5,751,698 | A * | 5/1998 | Cushman et al. | 370/252 |
| 5,982,748 | A * | 11/1999 | Yin et al. | 370/232 |
| 5,999,532 | A * | 12/1999 | Terasaki | 370/395.3 |
| 6,021,263 | A * | 2/2000 | Kujoory et al. | 709/232 |
| 6,046,981 | A * | 4/2000 | Ramamurthy et al. | 370/232 |
| 6,055,239 | A * | 4/2000 | Kato | 709/227 |
| 6,212,163 | B1 * | 4/2001 | Aida | 370/230 |
| 6,487,168 | B1 * | 11/2002 | Hamami | 370/216 |
| 6,597,689 | B1 * | 7/2003 | Chiu et al. | 370/354 |
| 6,598,080 | B1 * | 7/2003 | Nagami et al. | 709/227 |
| 6,700,890 | B1 * | 3/2004 | Langley et al. | 370/395.31 |
| 6,707,820 | B1 * | 3/2004 | Arndt et al. | 709/227 |
| 6,714,972 | B1 * | 3/2004 | Lee et al. | 709/220 |
| 6,781,996 | B1 * | 8/2004 | Hemmady | 370/395.21 |
| 6,788,696 | B2 * | 9/2004 | Allan et al. | 370/411 |
| 6,822,963 | B1 * | 11/2004 | Kavak | 370/395.21 |
| 2001/0032265 | A1 * | 10/2001 | Tanaka | 709/227 |
| 2002/0095504 | A1 * | 7/2002 | Ito | 709/227 |
| 2003/0101263 | A1 * | 5/2003 | Bouillet et al. | 709/225 |
| 2004/0015583 | A1 * | 1/2004 | Barrett et al. | 709/224 |
| 2004/0015590 | A1 * | 1/2004 | Nagami et al. | 709/227 |
| 2004/0170178 | A1 * | 9/2004 | Motobayashi | 370/395.1 |

OTHER PUBLICATIONS

The ATM Forum Glossary—"I". http://www.dit.upm.es/snh/arhelp/glossaries/atmf/gloss-i.html.*

ITU Q.2931. http://cell-relay.indiana.edu/cell-relay/docs/Q.2931.html, section 4, pp. 4-1 to 4-60, Jun. 1994.*

Shiraishi, S. Draft Text for Q.2931, Chapters 1-3. ITU—Telecommunication Standardization Sector., pp. 1-32 Jun. 1994.*

Hara, Takahiro et al. "Location Management Methods of Migratory Data Resources in ATM Networks." Proceedings of the 1997 ACM Symposium on Applied Computing. San Jose, CA. Apr. 1997. ACM Press. pp. 123-130.*

Salamon, Wayne J. "Configuring ATM Networks." Linux Journal. Feb. 1999. vol. 1999, Issue 58es. Article 6.*

* cited by examiner

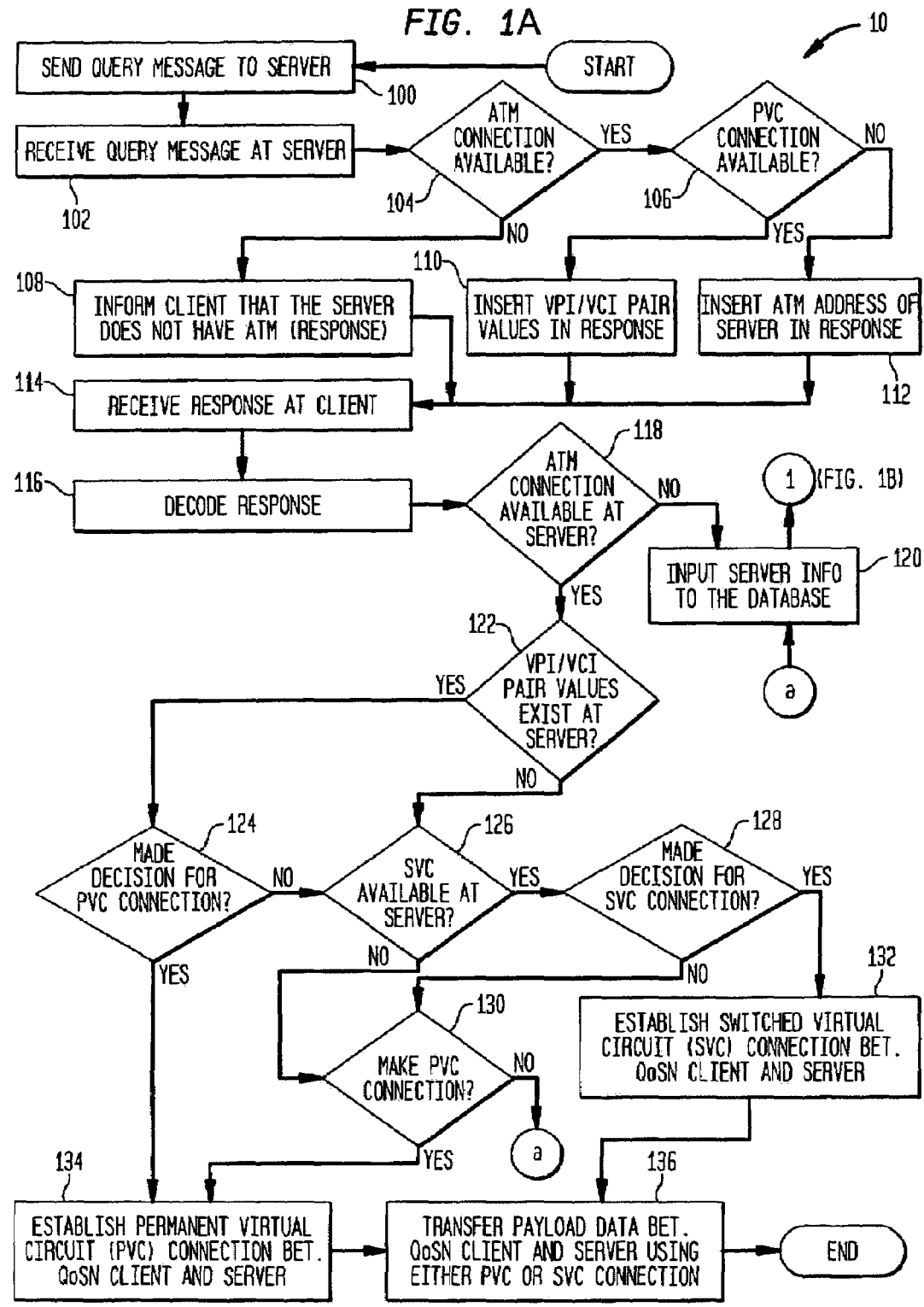

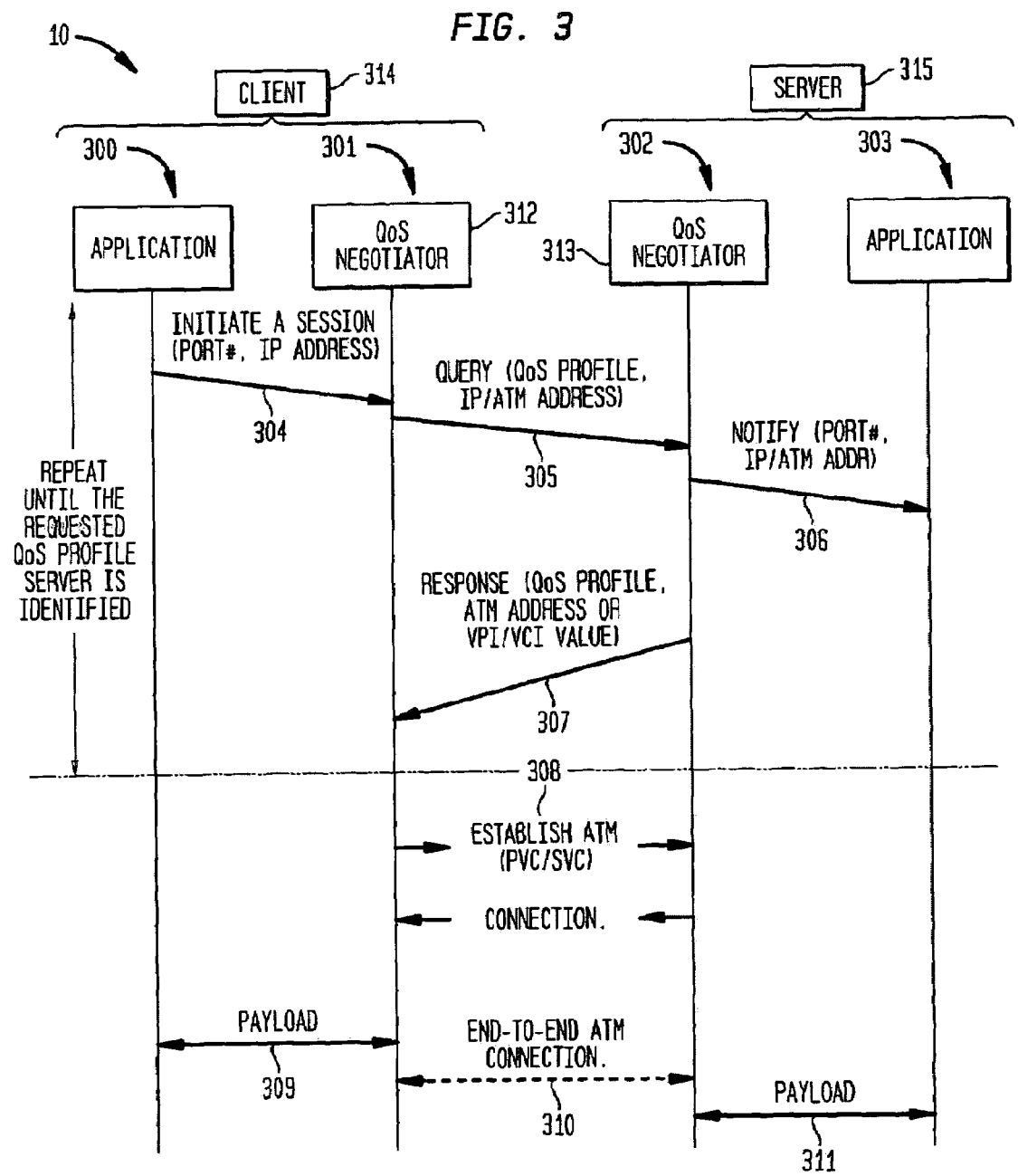

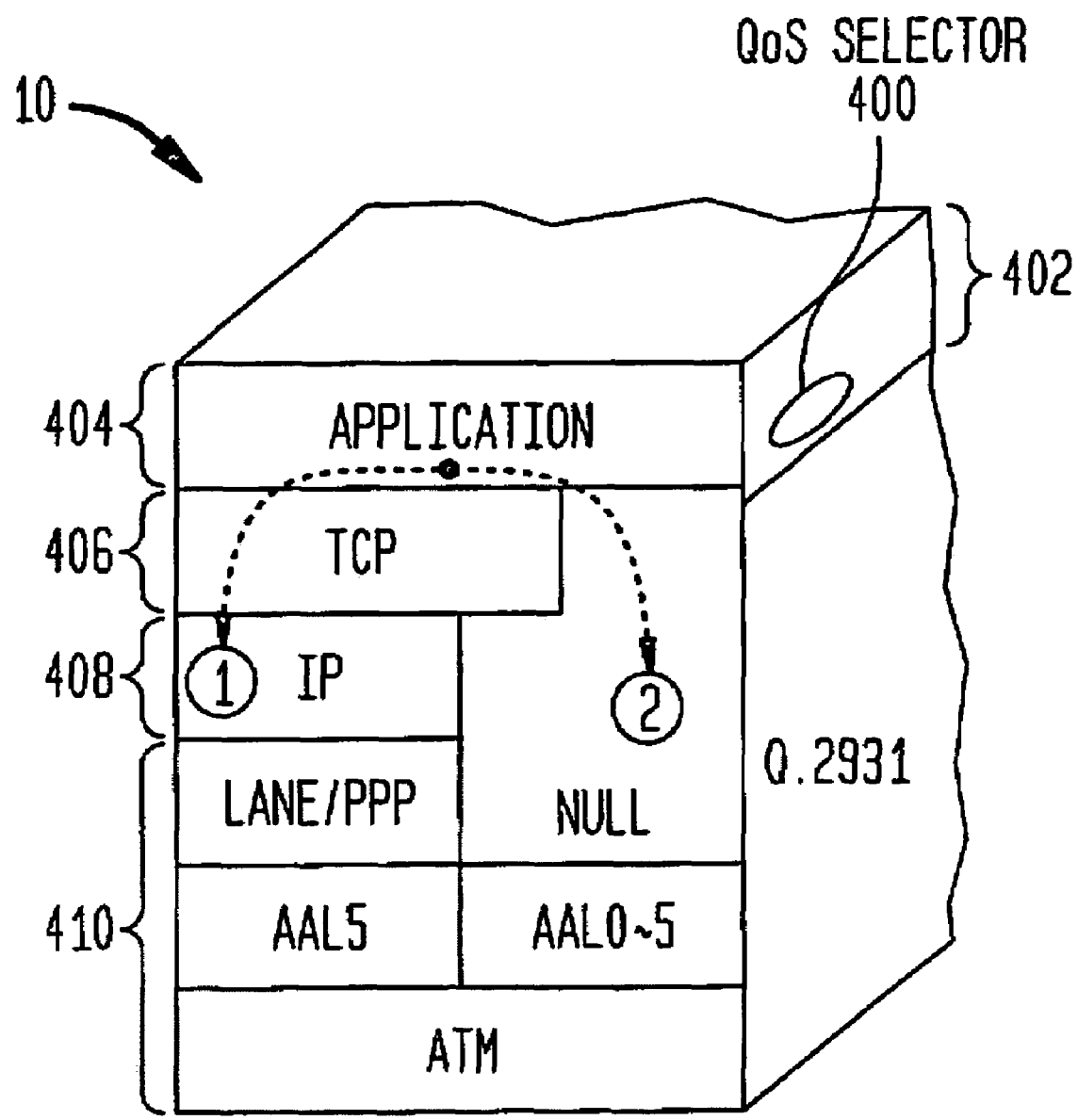

METHOD AND APPARATUS FOR PROVIDING END-TO-END QUALITY OF SERVICE IN MULTIPLE TRANSPORT PROTOCOL ENVIRONMENTS USING PERMANENT OR SWITCHED VIRTUAL CIRCUIT CONNECTION MANAGEMENT

RELATED APPLICATIONS

This application is a continuation-in-part of application Ser. No. 09/435,549 filed Nov. 8, 1999, now abandoned. The entire disclosure of this related application is expressly incorporated herein by reference.

BACKGROUND OF THE INVENTION

1. Field of the Invention

The present invention relates to a method and apparatus for providing end-to-end Quality of Service ("QoS") in Multiple Transport Protocol Environments using permanent or switched virtual circuit connection management. More specifically, the invention provides QoS selection and negotiation procedures among multiple server profiles that allow applications to selectively negotiate connections with servers having desired QoS parameters, regardless of the transport protocols and permanent or switched virtual circuit connection methodologies of the underlying network connection.

2. Related Art

U.S. patent application Ser. No. 09/435,549, filed Nov. 8, 1999, now abandoned, the parent application of the present invention, discloses a method and apparatus for providing quality of service ("QoS") negotiation procedures for multi-transport protocol access for supporting multi-media applications with QoS assurance. The present invention utilizes the QoS negotiation procedures of the parent application, and adds new QoS selection and negotiation features utilizing Permanent Virtual Circuit ("PVC") and Switched Virtual Circuit ("SVC") connection management.

To date, the Internet has grown at a near-exponential rate. Such growth has lead to an accompanying increase in the amount of data transmitted across the Internet, in addition to a general increase in the amount and variety of user applications. For example, diverse multimedia applications that support voice, streaming video, images, and other data types have gained popularity and market demand. However, despite the wonderful successes the Internet has experienced, a means for guaranteeing QoS, connection management, and security for such diverse applications is lacking.

The prevalent communications protocol used by the Internet is Transmission Control Protocol/Internet Protocol ("TCP/IP"). However, because TCP/IP was originally designed to transfer data, it has limited capability in guaranteeing QoS for non-real time data applications. Real-time applications such as voice and video, which require guaranteed QoS and multi-service provisioning, are therefore not adequately supported by TCP/IP. For example, when a user executes real-time applications such as voice or video, such applications may need to be supported with multi-service provisioning and guaranteed QoS which includes bounded delay and delay variance. Such applications may impose significant constraints on delay and/or delay variations. Generally speaking, the user does not sense degradation in the quality of the signal as long as the delay and/or delay variations are bounded.

Asynchronous Transfer Mode ("ATM") is a widely-used networking technology that guarantees a variety of QoS types for almost every type of traffic characteristic. Because the protocol was explicitly designed to support connection-oriented service and provides various QoS's, it can provide unified transport methods to send data using circuit emulation. In addition, the ATM transport can support real-time voice or video applications while satisfying the QoS requirements for such applications precisely.

However, given a choice between multiple servers connected by ATM links to the service premise equipment (i.e., ATM switches), there should be a method for end-user customer premise equipment (i.e., user workstations) to select between the QoS profiles and services provided by these servers. The present difficulty in the art, however, arises when such servers have varying ATM connection methodologies, thereby giving rise to the need to provide QoS selection and negotiation procedures that can adapt to the varying methodologies, working efficiently and reliably therewith.

Permanent Virtual Circuit ("PVC") and Switched Virtual Circuit ("SVC") represent two of the most prevalent connection methodologies for ATM networks currently known in the art. PVC uses pre-established connections that can be configured by an operator. The operator can establish a PVC by setting up a Virtual Path ("VP") or Virtual Channel ("VC") between a server and a client machine, either directly or through a series of ATM connections. When VPs or VCs are established, Virtual Path Identifier ("VPI") or Virtual Circuit Identifier ("VCI") values become available. If either the VPI or VCI values are provided, a user can connect to a server using a PVC. Such a PVC can be established through multifarious physical interconnect media and protocol combinations, such as Point-to-Point Protocol ("PPP") over ATM over Digital Subscriber Line ("DSL"). The PVC, therefore, serves as a connection path that ensures QoS for user applications that communicate with the server.

In the SVC arrangement, pre-established connections are not available, thereby precluding the existence of VPI and VCI values. In order to effectuate a connection between a user and a server via an SVC connection, the ATM address of the server is utilized. Such an address may become available when the user normally browses over the Internet. When the user acquires the ATM address of the server, an SVC connection can be then be established. Thus, a connection between a user and a server can occur using either a SVC or a PVC.

The present invention allows a user to connect to a server by allowing the user's applications to utilize either PVC or SVC connections to transmit data to and from the server. In this arrangement, a choice of different QoS server profiles becomes available to the user, thus eliminating the need for ATM signaling in the event that there are multiple servers connected by various permanent links. A variety of end-to-end QoS profiles may be selected, regardless of the multiple transport protocols of the underlying network or the SVC or PVC arrangements of such networks.

OBJECTS AND SUMMARY OF THE INVENTION

It is an object of the present invention to provide a method and apparatus for ensuring end-to-end QoS for user applications.

It is another object of the present invention to provide QoS selection and negotiation procedures in multiple transport protocol environments.

It is a further object of the present invention to allow user applications to connect to servers using a variety of ATM connection paths.

It is still another object of the present invention to allow a client machine to selectively connect to one of a plurality of servers each having varying QoS profiles.

It is yet another object of the present invention to establish connections between client machines and servers using Asynchronous Transfer Mode ("ATM") Permanent Virtual Circuit ("PVC") and Switched Virtual Circuit ("SVC") connections.

It is an additional object of the present invention to provide a database in a client machine that stores server QoS and ATM connection information.

It is still another object of the present invention to allow a client machine to retrieve server QoS and connection information from a database stored in the workstation.

It is a further object of the present invention to provide QoS negotiation and selection procedures that establish PVC or SVC connections based upon Virtual Path Identifier ("VPI"), Virtual Channel Identifier ("VCI"), or ATM address information.

It is another object of the present invention to provide a device having internal QoS negotiation and selection procedures that can be utilized with ATM PVC or SVC connection methodologies.

The present invention relates to a method and apparatus for ensuring end-to-end QoS for user applications operating in multi-transport protocol environments having varying PVC or SVC connection methodologies, using QoS selection and negotiation procedures. A user application at a client machine (i.e., a workstation) having specific QoS requirements can selectively connect to one of a plurality of servers having varying QoS profiles, regardless of the transport protocols and PVC or SVC connection methodologies of the underlying network. The QoS selection and negotiation procedures exchange QoS, ATM, PVC, and SVC information and establish a connection between a client machine and a server machine having guaranteed QoS. A database at the client is utilized by user application to determine if a server having the desired QoS profile exists. The database is dynamically updated as server QoS, ATM, PVC, and SVC connection information changes, thereby allowing the client to adapt to varying network and QoS conditions.

BRIEF DESCRIPTION OF THE DRAWINGS

Other objects and features of the invention will be apparent from the following Detailed Description of the Invention, taken in conjunction with the accompanying drawings, in which:

FIG. 1a is a flowchart showing system operation of the present invention.

FIG. 3 is a process diagram showing QoS selection and negotiation procedures of the invention.

FIG. 4 is a diagram showing an exemplary protocol stack containing QoS selection and negotiation procedures of the present invention.

DETAILED DESCRIPTION OF THE INVENTION

Figure 1B:
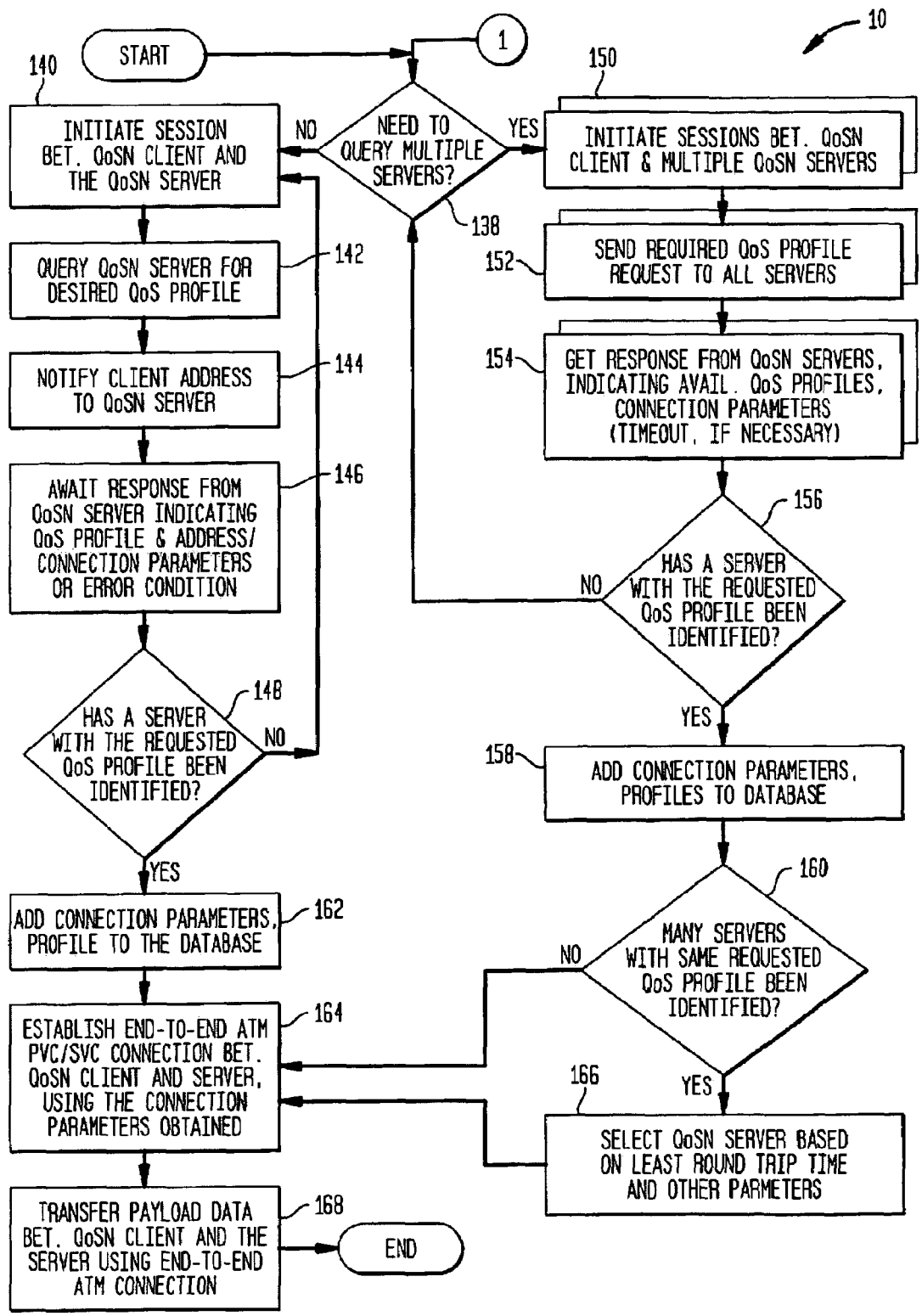
FIG. 1b is a flowchart showing additional system operation of the present invention.

The QoS selection and negotiation procedures of the present invention allow a user application to connect to one of a plurality of servers having a desired QoS profile, using either permanent virtual circuit ("PVC") or switched virtual circuit ("SVC") connection types and regardless of the transport protocols used in the underlying network. Virtual path identifier ("VPI") and virtual circuit identifier (VCI") values, in addition to asynchronous transfer mode ("ATM") address information, allow the QoS selection procedures to determine whether a PVC or SVC connection can be established between the application and the server. A database of server QoS profiles and connection data allows the QoS selection procedures to choose which server to connect to, based upon the QoS profiles of the servers stored in the database. End-to-end QoS between the user application and the server can be guaranteed, further allowing applications having high QoS requirements to exchange data reliably and with minimal interruption.

According to the present invention, a given user application executing on a client machine and having specific QoS requirements can utilize QoS selection and negotiation procedures of the present invention to effectuate a reliable PVC or SVC connection between the application and a desired server. The establishment of PVC or SVC connections between the client machine and the desired server is effectuated by QoS selection procedures, which may be implemented in QoS negotiation ("QoSN") apparatuses or processes residing in both the client machine and the desired server. Further, the QoS selection and negotiation procedures of the present invention may be implemented either in software or in hardware.

Referring now to the drawings, wherein like reference numerals indicate like parts, FIG. 1a is a flowchart showing overall system operation of the present invention 10. Beginning with step 100, a query message originating from a QoSN client and requesting a desired QoS profile for a user application running on the client machine is sent to a QoSN server. Such a query can take the form of an ICMP/IP query message containing server request information, in return for which an ICMP/IP reply message is sent from the QoSN server. The query message can also originate from any customer premise equipment, and can be received by any service premise equipment.

Once the query message is sent in step 100, it is then received by a QoSN server in step 102. Step 102 then invokes step 104, wherein a decision is made as to whether an ATM connection is available between the QoSN client and server. If so, step 104 invokes step 106; otherwise, step 104 invokes step 108. If step 106 is invoked, a second decision is then made as to whether a PVC connection is available and can be effectuated between the QoSN client and server. Such PVC connections can be made available by a network administrator who configures the connections within the service premise equipment. If a PVC connection is available, step 106 invokes step 110, wherein the VPI/VCI pair values for the PVC connection are obtained and stored in a response message. Alternatively, if a PVC connection is not available, an SVC connection can be utilized to effectuate a connection between the server and the client. Thus, if a PVC connection is not available, step 106 invokes step 112. In step 112, the ATM address of the server is obtained and stored in a response message. The response generated by either step 110 or step 112 is then received by the QoSN client in step 114.

In the event that step 104 determines that an ATM connection is not available between the QoSN client and server, step 104 invokes step 108. In step 108, a response is formulated by the QoSN server indicating that an ATM connection is not available. Step 108 then invokes step 114, wherein the response is received at the QoSN client.

Upon receiving the response in step 108, the QoSN client then decodes the response in step 116 and invokes step 118. A decision point is reached in step 118 to determine whether an ATM connection is available at the server. If so, step 118 invokes step 122. Alternatively, if an ATM connection is not available at the server, step 118 invokes step 120, wherein information about the QoSN server is stored into the database residing in the QoSN client. Processing in step 120 then continues according to the procedures described below for FIG. 1b.

In step 122, a second decision point is reached, wherein the QoSN client determines whether VPI or VCI pair values exist for the QoSN server. If such values do exist, step 122 invokes step 124; otherwise, step 126 is invoked. In step 124, a determination is made as to whether a PVC connection should be established with the QoSN server. If a positive determination is made, step 124 invokes step 134; otherwise, if a negative determination is made, step 126 is invoked. In step 134, a PVC connection is established between the QoSN client and server. Then, step 134 invokes step 136, whereby payload data originating from the QoSN client begins transmission to the QoSN server.

In the event that step 124 determines that a PVC connection should not be established, step 126 is invoked, wherein a determination is made as to whether an SVC connection is available at the QoSN server. If an SVC connection is not available, step 130 is invoked, whereby a determination is made as to whether a PVC connection should then be made to the QoSN server. If so, step 130 invokes step 134, described earlier, so that a PVC connection can be made to the QoSN server and payload data exchanged between the QoSN client and server. Alternatively, if step 130 determines that a PVC connection should not be made, step 130 invokes step 120, described above, so that information about the QoSN server can be stored in the QoSN client database.

In the event that step 126 determines that an SVC connection is available, step 126 invokes step 128, whereby another determination is made. If step 128 determines that an SVC connection should not be made, step 128 invokes step 130, so that a decision regarding a PVC connection can be made. Alternatively, if step 128 determines that an SVC connection should be made, step 132 is invoked. In step 132, an SVC connection is established between the QoSN client and server, using the ATM connection and address information stored in the response from the QoSN server. Thus, an SVC connection is effectuated, and payload data can be transferred between the QoSN client and server in step 136, using the established SVC connection.

FIG. 1b is a flowchart showing additional system operation of the present invention 10. As mentioned earlier, a user application having specific QoS requirements can utilize the QoS selection and negotation procedures of the present invention 10 to effectuate a reliable PVC or SVC connection between the user application and a desired server. Beginning with step 138, a decision is made as to whether a given application running on a client machine requires connection with multiple servers connected via a network. If step 138 determines that multiple servers need to be queried, step 140 is invoked. Otherwise, step 150 is invoked.

In step 140, a session is initiated between a QoSN client and a QoSN server at the request of a user application running on the client machine. When the session is established by step 140, step 142 is invoked, wherein the QoSN server is queried by the QoSN client for a machine having a QoS profile demanded by the user application. After issuing this query, step 142 then invokes step 144, whereby the QoSN client notifies the QoSN server of its address. Then, in step 146, the QoSN client awaits a response from the QoSN server indicating the QoS profile and address of a server having a desired QoS level. Alternatively, in step 146, the QoSN client can receive an error condition from the QoSN server. After having received the response, a decision is made in step 148.

In step 148, the response sent from the QoSN server is analyzed to determine if a server having the QoS profile requested by the user application has been identified. If a server having such a QoS profile has not been identified, step 148 re-invokes step 140, wherein the QoS selection and negotiation procedures described above are re-iterated. If a server having the desired QoS profile has been identified, step 148 invokes step 162. At this point, the process of selecting an appropriate server having a desired QoS profile has completed, and a connection between the QoSN client and server is established.

In step 162, the connection parameters and profile of the QoSN server is stored in a local database in the QoSN client. This information is utilized to effectuate a connection with the QoSN server, and also for reference in establishing future connections. Then, once the connection parameters and profile information have been stored in the database, step 162 invokes step 164. Step 164 determines whether an ATM PVC or SVC connection should be made between the QoSN client and server, and establishes the connection accordingly. Once an end-to-end connection is established, using either PVC or SVC, step 164 then invokes step 168.

In step 168, payload data (e.g., data originating from the user application executing at the client) is then transmitted between the QoSN client and server using the end-to-end connection established in step 164. In this fashion, applications in the first host that have high QoS requirements can reliably connect to the selected server and exchange data using either a PVC or SVC end-to-end connection, regardless of the transport protocols used in the underlying network.

In the event that step 138, discussed above, determines that the application running on the QoSN client needs to connect to multiple servers, step 150 is invoked in lieu of step 140. In step 150, sessions are initiated between the QoSN client and a plurality of QoSN servers, so that QoS selection and negotiation procedures can be initiated therebetween. Once the sessions are initiated, step 150 invokes step 152. In step 152, the QoSN client's profile, including QoS requirements for the user application running on the QoSN client, is sent to each of the QoSN servers. Step 154 is then invoked, wherein responses from the QoSN servers are gathered, indicating the availability of any servers meeting the QoS requirements of the user application or the client QoSN profile. These responses, similar to the response received in step 146, contain QoS profile information, server address information, and connection information. Additionally, the responses may include timeout indications or error conditions.

When the responses from the QoSN servers are gathered, step 154 then invokes step 156, which is similar in operation to step 148, described above. In step 156, a determination is made as to whether a server having the requested QoS profile has been identified. If not, step 156 re-invokes step 138, so that additional servers may be identified. If a server with the requested QoS profile has been identified, step 156 invokes step 158. In step 158, connection parameters are added to a database located at the QoSN client, for usage in establishing a connection with the server and for assisting future connections. Once the connection parameters have been stored, step 158 then invokes step 160.

In step 160, a determination is made as to whether a plurality of servers having the desired QoS profile exist. If many servers exist, step 160 invokes step 166, wherein a single server having the desired QoS profile is selected, based upon least round-trip time and other communications parameters. Then, step 166 invokes step 164, described above. Alternatively, if step 160 determines that a plurality of servers having the desired QoS profile do not exist, step 160 invokes step 164.

Once step 164 is invoked, processing continues as described above and according to steps 164 and 168. Thus, an end-to-end connection between the QoSN client and QoSN server are established, using either PVC or SVC connection methodologies, and payload data transferred therebetween.

According to the methodology described above, the QoSN client and server have the capability of communicating with each other using either PVC or SVC connections. Further, the absence of a PVC connection will not hinder the establishment of communications between the QoSN client and server, because an SVC connection can be used. Vice versa, the absence of an SVC connection will not hinder the establishment of communications, because PVC connections can be used. A dynamic connection management methodology is therefore effectuated between the QoSN client and server.

Importantly, the QoS profile information exchanged between a QoSN client and QoSN server can comprise multiple quanta of data. Such data includes, but is not limited to: protocol types, media information, bandwidth parameters, delay information, delay variance information, and billing information. This information allows both the QoSN client and server to select and negotiate a connection having a desired QoS level, and further allows the QoSN client to select a given server having the desired QoS level.

Figure 1C:
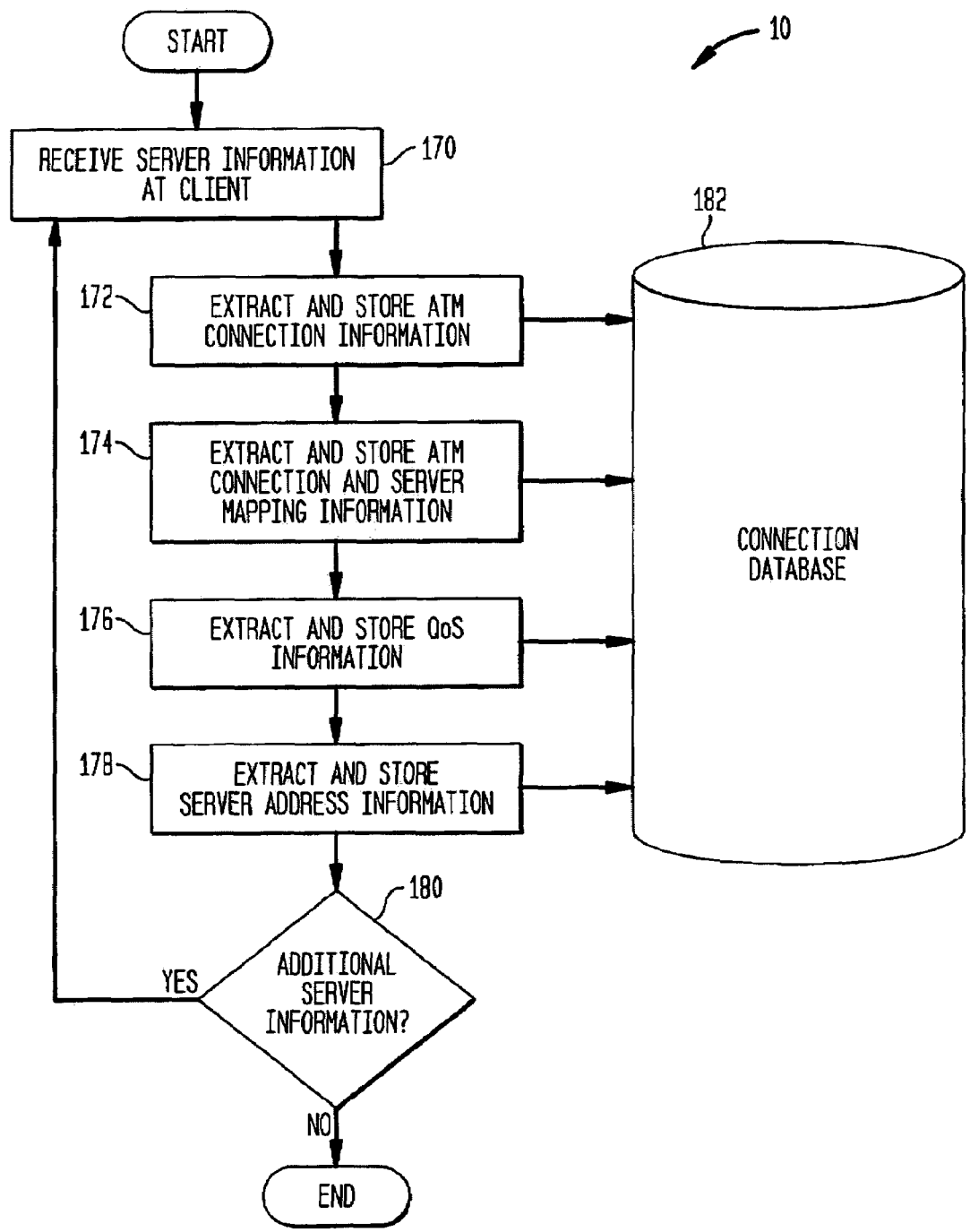
FIG. 1c is a flowchart showing QoS profile and connection database update procedures of the invention.

Referring now to FIG. 1c, a client having QoS selection and negotiation features of the present invention 10 can select from a multitude of servers having varying QoS profiles. In this arrangement, the client can match a server having a given QoS profile to an application having identical QoS requirement, so that the QoS requirements of the application are adequately met. Such matching is enabled through a connection database 182, which stores, at the client, information pertaining to the QoS profiles and connection information of the varying servers.

When one of a plurality of servers is queried by the client, step 170 receives, at the client, information pertaining to the given server. Information about the server is then decoded in steps 172, 174, 176, and 178, and stored in connection database 182 for future use by the client in choosing a server having the desired QoS profile. The received server information is transferred from step 170 to step 172, where ATM connection information is extracted and then stored in database 182. Such connection information describes how the server is connected to the underlying network, and how it may be reached by the client. Then, step 172 invokes step 174, wherein server mapping information, in conjunction with matching ATM connection information, is extracted and stored into database 182.

Step 174, upon extracting and storing server mapping information, invokes step 176. In step 176, QoS profile information corresponding to the server is extracted and stored in database 182. Finally, step 178 is invoked, whereby the server's address information is extracted and stored in database 182. It is to be understood that additional server information not reflected in steps 172, 174, 176, and 178 may be extracted and stored in connection database 182.

Once all of the server information has been extracted and stored in connection database 182, step 180 is invoked. A decision is made as to whether additional server information exists, and if so, step 180 re-invokes step 170. If no further server information exists, step 180, then terminates, and connection database 182 is then in an updated condition reflecting all of the available servers to which the client can connect.

Figure 1D:
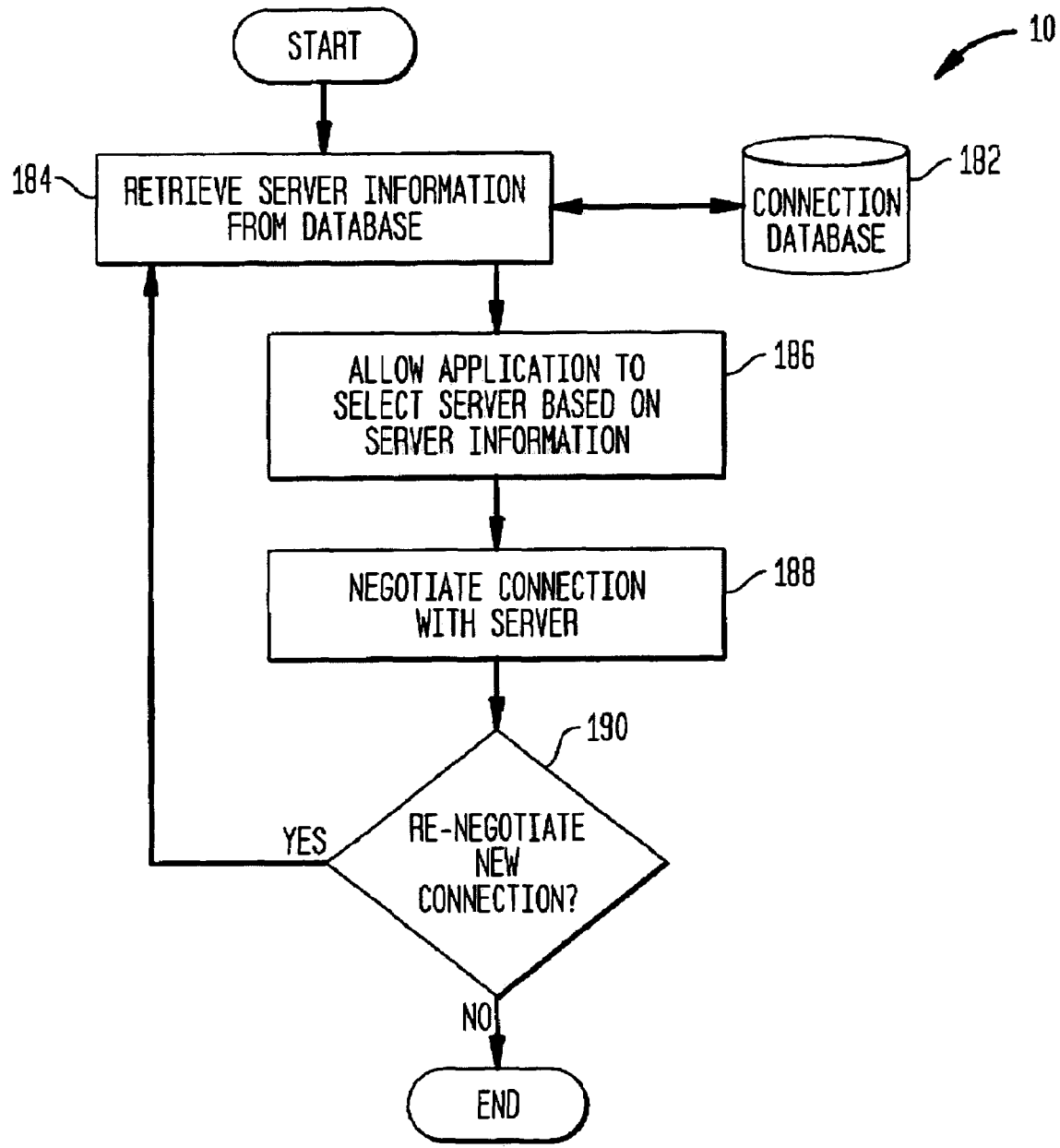
FIG. 1d is a flowchart showing QoS profile and connection database query procedures of the invention.

FIG. 1d is a flowchart showing the QoS profile and connection database query procedures of the present invention 10. Once the client has updated connection database 182 with all QoS profile and connection information in the manner described above, it then analyzes the database to choose a server having the desired QoS profile for a given application running on the client. To choose the desired server, the client machine invokes step 184, wherein server information is retrieved from connection database 182. Step 186 is then invoked, wherein the client allows an application running on the client to select a server based upon server information. Such a selection is preferably made according to the QoS profile of the server, but may also be made according to other parameters stored in connection database 182. When a specific server is chosen, step 186 invokes step 188, wherein the client then negotiates a connection with the server. Once the connection is negotiated, data can then be exchanged between the client and the server. Additionally, step 188 invokes step 190, wherein a decision is made as to whether a new connection should be re-negotiated. If so, step 190 re-invokes step 184, and the database is analyzed and a new server selected. If a new connection is not desired, step 190 terminates.

In the arrangement described above, a given client can query a specific server, or a plurality of servers, to determine the QoS profiles of such servers. Then, the client can determine a server to which a connection should be made. Such connection, as described earlier and depicted in FIGS. 1a, 1b, can be effectuated over a PVC or SVC connection, and can be made regardless of the underlying transport protocol of the network.

Figure 2:
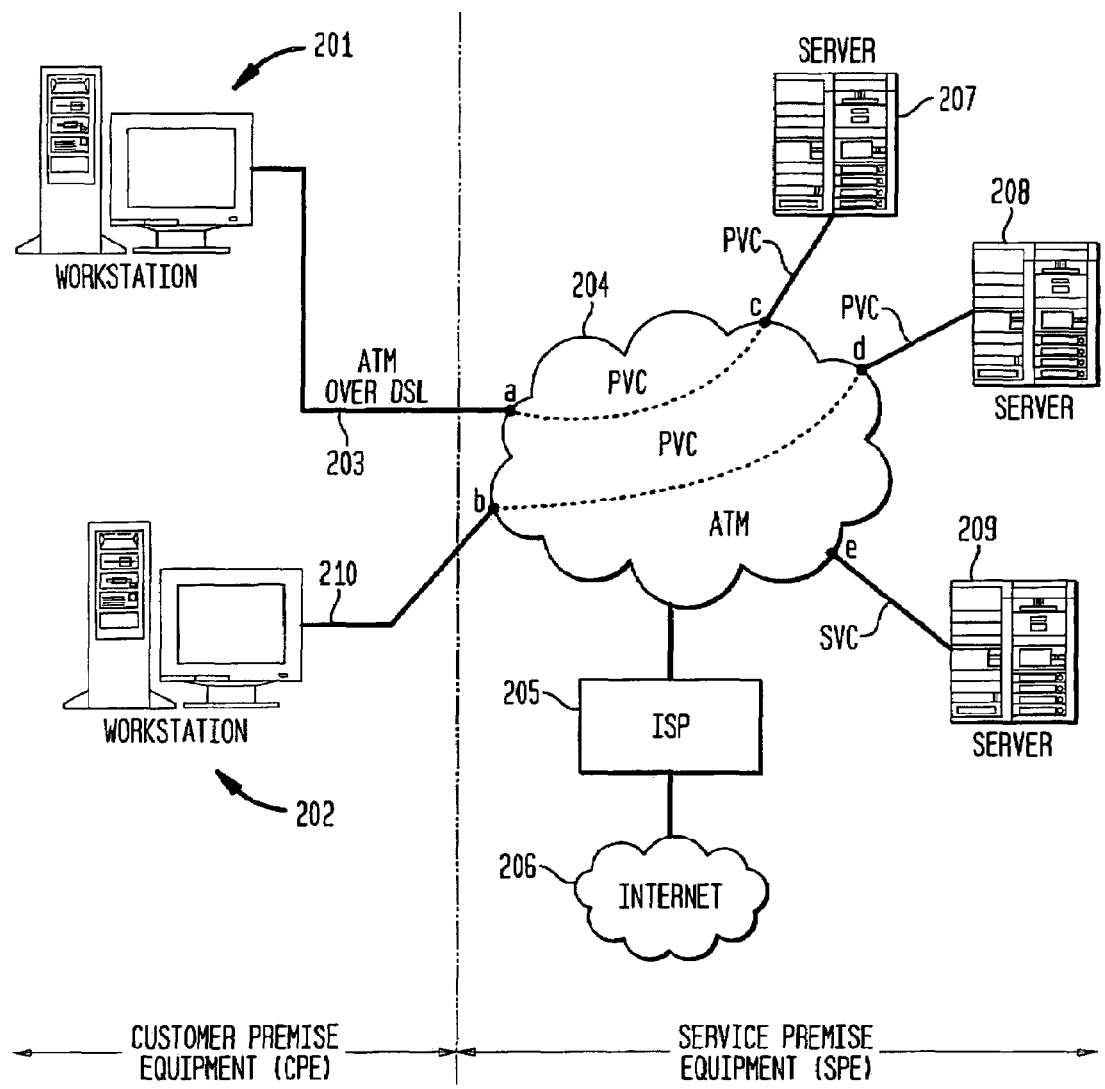
FIG. 2 is a diagram showing a physical implementation of the present invention using customer premise equipment and service premise equipment.

FIG. 2 is a diagram showing a physical implementation of the present invention using customer premises equipment and service premise equipment. Workstations 201, 202 comprise customer premise equipment that may be connected to a network 204 at connection point "a" using, for example, ATM over DSL connection 203. Alternatively, workstations 201, 202 can be connected to network 204 at connection point "b" using network connection 210. Connected to network 204 are a plurality of servers 207, 208, and 209, each connected to network 204 via connection points "c," "d," and "e," respectively. It is to be noted that additional workstations, clients, and connection methodologies are contemplated by the present invention. Additionally, network 204 can be connected to Internet Service Provider 205, which is thence connected to network 206. Servers 207, 208, 209, network 204, and ISP 206 together comprise service premises equipment.

As illustrated in FIG. 2, connection points "a," "c" are connected to each other using a PVC connection. Additionally, connection points "b," "d" are likewise connected via a PVC connection. Thus, servers 207, 208, and workstations 201, 202 have available PVC connection paths therebetween. Alternatively, server 209 is connected to network 204 at connection point "e" via an SVC connection. Accordingly, both PVC and SVC connections are available in network 204.

Servers 207, 208, using the QoS selection and negotiation procedures of the present invention, store information regarding the PVC connection paths. Additionally, server 209, also using the QoS selection and negotiation procedures of the present invention, store information regarding the SVC connection. Workstations 201, 202 can connect to servers 207, 208, and 209 using either the PVC or SVC connection paths. Advantageously, the QoS selection and negotiation procedures of the present invention, in conjunction with the connection databases residing in the workstations, allow workstations 201, 202 to dynamically connect to servers 207, 208, 209 using either PVC or SVC connections. This is achieved transparently to the user, and accomplished via the selection and negotiation procedures described above.

FIG. 3 is a process diagram showing the QoS selection and negotiation procedures of the present invention 10. Communication with a client machine 314 and a server 315 is effectuated using the QoS selection and negotiation procedures of the present invention 10. Such communication begins with a first request 304 by a user application 300 residing at the client machine 314. Request 304 represents a request to initiate a session with server 315, and comprises a port number and IP address of server 315. It is to be understood that request 304 can comprise additional information about server 315 or the underlying network connecting client machine 314 and server 315.

Request 304 is then received by QoS negotiator 301, residing at client 314 and containing QoS selection procedures 3. Both QoS negotiator 301 and its associated QoS selection procedures 312 formulate a query 305 comprising QoS profile information about the application, in addition to IP and ATM address information. Further, query 305 can contain billing information related to a service provider. Query 305, once formulated, is then sent by QoS negotiator 301 to QoS negotiator 302 residing at server 315. Similar to QoS negotiator 301, QoS negotiator 302 contains QoS selection procedures 313. Both QoS negotiator 302 and QoS selection procedures 313, upon receiving query 305, formulate and transmit a notification 306 to server application 303. Additionally, QoS negotiator 302 and QoS selection procedures 313 generate a response 307 containing QoS profile information and either ATM address error information or VPI/VCI pair value information corresponding to server 315. Similar to query 305, response 307 can also contain service provider billing information.

Upon receiving response 307, QoS negotiator 301 and QoS selector 312 determine whether a connection to server 315 is possible, using either an SVC or PVC connection, and whether server 315 has a desired QoS level for client application 300. If a connection is not available to server 315, or if server 315 does not have the desired QoS level, processing can repeat in the manner described above so that another server can be identified and QoS selection and negotiation effectuated between the client and the other server. Importantly, this feature allows client application 300 to choose a server having the desired QoS level from a variety of available servers.

In the event that QoS negotiator 301 and QoS selection procedures 312 determine that server 315 has the desired QoS level for user application 300, a connection process 308 is initiated between client machine 314 and server 315. Depending upon information in response 307, either a PVC or SVC connection will be effectuated between client machine 314 and server 315. Once a connection is established in connection process 308, payload data 309, 311 originating from user application 300 can then be transferred between client machine 314 and server 315 using end-to-end ATM connection 310 established by connection process 310. Thus, a reliable, end-to-end connection using either a PVC or SVC ATM connection can be established between client machine 314 and server 315, and client application 300 is provided with a desired QoS level.

Referring now to FIG. 4, depicted is a diagram showing an exemplary protocol stack containing the QoS selection and negotiation procedures of the present invention 10. QoS selection procedures may be embodied as QoS selector 400, which forms part of QoS negotiator 402. Both QoS selector 400 and QoS negotiator 402 reside at application layer 404, along with the user application. Below link layer 404, QoS selector 400, and QoS negotiator 402 are transport layer 406, network layer 408, and data link layer 410. Various protocols known in the art may reside at these layers, thereby allowing QoS selector 400 and QoS negotiator 402 to operate with a wide array of such protocols.

For example, as illustrated in FIG. 4, transport layer 404 may comprise either the Transmission Control Protol ("TCP") or the User Datagram Protocol ("UDP"). At network layer 408 resides Internet Protocol ("IP"). Further, at data link layer 410 there may be a variety of connection methodologies such as Point-to-Point Protocol ("PPP"), LANE/PPP, ATM Application Layers ("AAL") 0-5, or ATM protocol. Because a variety of protocols can exist at the above-described layers, a variety of connection options can exist between application layer 404 and the underlying network, utilizing QoS selector 404 and QoS negotiator 402. For example, an application executing at application layer 404 can communicate using TCP over IP. Further, such an application can also communicate using a PVC or SVC connection directly connected to data link layer 410 and thence to an underlying network. The PVC and SVC connection methodologies enabled by QoS selector 400 and QoS negotiator 402 thereby allow applications to seamlessly communicate with the underlying network using a variety of connection methodologies.

Having thus described the invention in detail, it is to be understood that the foregoing description is not intended to limit the spirit and scope thereof. What is desired to be protected by Letters Patent is set forth in the appended claims.

What is claimed is:

1. A method for providing end-to-end QoS for applications running in multiple transport protocol environments which comprises:

formulating a query message at a client machine, said query message containing a source IP address and a QoS profile requirement of a user application and data requesting information indicating the availability of PVC connections and SVC connections at the server;

sending the query message to a server machine;

decoding the query message at the server machine;

in response to the decoded query message, determining availability of PVC connections and SVC connections at the server;

formulating a response message at the server machine, said response message containing server information and the availability of the PVC connections and the SVC connections the response message including a virtual path identification (VPI) or a virtual channel identifier (VCI) if a PVC connection is available at the server;

sending the response message to the client machine;

decoding the response message at the client machine; and connecting the client machine to the server machine using either only the PVC connection or only the SVC connection based upon the response message.

2. The method of claim 1, further comprising:

connecting the client machine to the server machine using the PVC connection when the response message indicates that the PVC connection is available.

3. The method of claim 2, further comprising:

connecting the client machine to the server machine using the SVC connection when the response message indicates that the SVC connection is available.

4. The method of claim 1, further comprising:

receiving additional response messages from the server;

extracting server information stored in the additional response messages; and storing the server information in a connection database at the client machine.

5. The method of claim 4 further comprising repeating the steps of claim 4 until a server having the QoS profile has been identified.

6. The method of claim 5 further comprising connecting the client machine to the server having the desired QoS profile.

7. An apparatus for providing end-to-end QoS for a client application which comprises:

a QoS selector located at a client machine, the QoS selector configured to gather client application QoS requirements and to formulate connection requests;

a second QoS selector located at a server machine, the second QoS selector configured to receive the connection requests and to formulate connection responses indicating multiple connection availability comprising PVC connection availability and SVC connection availability, the connection response including a virtual path identifier (VPI) or a virtual channel identifier (VCI) if a PVC connection is available at the server machine;

means for storing server information at the client machine the stored information, including the VPI or VCI data if a PVC channel is available at the server machine; and connection means located at the client machine, said connection means receiving the connection response and connecting the client application to the server machine using either only the PVC connection or only the SVC connection based upon the connection response.

8. The apparatus of claim 7, wherein the first QoS selector is configured to store an IP address of the client machine in the connection request.

9. The apparatus of claim 8, wherein the second QoS selector is configured to store an ATM address of the server machine when an SVC connection exists at the server machine.

10. The apparatus of claim 7, wherein the connection means establishes a PVC connection between the client machine and the server machine when the VPI/VCI connection pair values are detected in the connection response.

11. The apparatus of claim 10, wherein the connection means establishes an SVC connection between the client machine and the server machine when the ATM address is detected in the connection response.

12. The apparatus of claim 11, wherein the storage means extracts ATM connection information, server mapping information, server QoS information, and server address information from the connection response.

13. The apparatus of claim 12, wherein the storage means stores the ATM connection information, server mapping information, server QoS information, and server address information in a connection database.

* * * * *